United States Patent
Zechnall et al.

[11] 3,935,444
[45] Jan. 27, 1976

[54] POLARIZED LIGHT BEAM SOURCE IN A VEHICLE HEADLIGHT

[75] Inventors: Richard Zechnall, Stuttgart; Ernst Linder, Muhlacker; Albert Schmid, Schwieberdingen; Gotthold Raabe, Stuttgart; Karl Kerner, Stuttgart; Rudi Socknick, Kornwestheim, all of Germany

[73] Assignee: Robert Bosch G.m.b.H., Stuttgart, Germany

[22] Filed: Sept. 3, 1974

[21] Appl. No.: 502,761

[30] Foreign Application Priority Data
Sept. 10, 1973  Germany............................. 2345633

[52] U.S. Cl. ................ 240/9.5; 240/41.4; 350/147; 350/152
[51] Int. Cl.² .......................................... F21M 3/26
[58] Field of Search ............ 240/9.5, 41.4; 350/147, 350/152

[56] References Cited
UNITED STATES PATENTS

| | | | |
|---|---|---|---|
| 2,270,535 | 1/1942 | Land et al............................ | 240/9.5 |
| 2,748,659 | 6/1956 | Geffchew et al..................... | 240/9.5 |
| 2,887,566 | 5/1959 | Marks................................... | 240/9.5 |
| 3,743,380 | 7/1973 | Fugitt................................... | 240/9.5 |
| 3,808,422 | 4/1974 | Handtmann et al. ................ | 240/9.5 |

Primary Examiner—Joseph F. Peters, Jr.
Attorney, Agent, or Firm—William R. Woodward

[57] ABSTRACT

A polarizer structure for a headlight includes an interference-type polarizer followed by an absorption-type polarizer. The interference-type polarizer in one form of the invention is constituted by rectangular plate polarizing sections in a zigzag arrangement, so that the apex angle formed by adjacent polarizing sections is always 90° while the angle of each polarizing section to the optic axis is 45°. In another form of the invention, the polarizer sections are arranged in a diverging louvre arrangement provided with reflecting layers between the polarizing sections, both the polarizing sections and the reflecting layers at an angle of 45° with the optic axis.

6 Claims, 6 Drawing Figures

POLARIZED LIGHT BEAM SOURCE IN A VEHICLE HEADLIGHT

This invention relates to a polarized light headlight for a motor vehicle with an interference-type polarizer in which the light beam, after passing through the interference-type polarizer is subjected to a second polarizer system to improve the polarization of the beam, the second polarization system consisting essentially of a selective absorption-type polarization filter.

Polarized light headlights of this general type have already been proposed. Those heretofore proposed have the disadvantage that their physical dimensions in the direction of the optic axis are relatively large.

It is an object of the present invention to provide a polarized light headlight with a physical dimension in the direction of the optic axis which is as small as possible.

SUBJECT MATTER OF THE PRESENT INVENTION

Briefly, an interference-type polarizer is provided that consists of several plate-like polarizing sections disposed with a zigzag profile in such a way that the apex angle formed by adjacent polarizing sections is always 90°, while the angle of each polarizing section to the optic axis is 45°.

In another form of the invention, the interference-type polarizer is constituted by polarizer sections arranged in 45° louvre fashion about the optic axis, diverging on each side of a plane passing through the optic axis, and furthermore provided with reflecting layers between the polarizing sections so that polarizing sections alternate with reflecting layers, in each case at an angle of 45° with the optic axis and, so that the projection of the polarizing sections and of the reflecting layers in the direction of the optic axis cover each other without gaps. Finally, the projections of the areas of the polarizing sections and of the reflecting layers in a direction perpendicular to the optic axis (and to the aforesaid plane therethrough) are congruent and essentially define a rectangle.

The invention is described in further detail by way of illustration with respect to the annexed drawings, in which.

Figure 1:
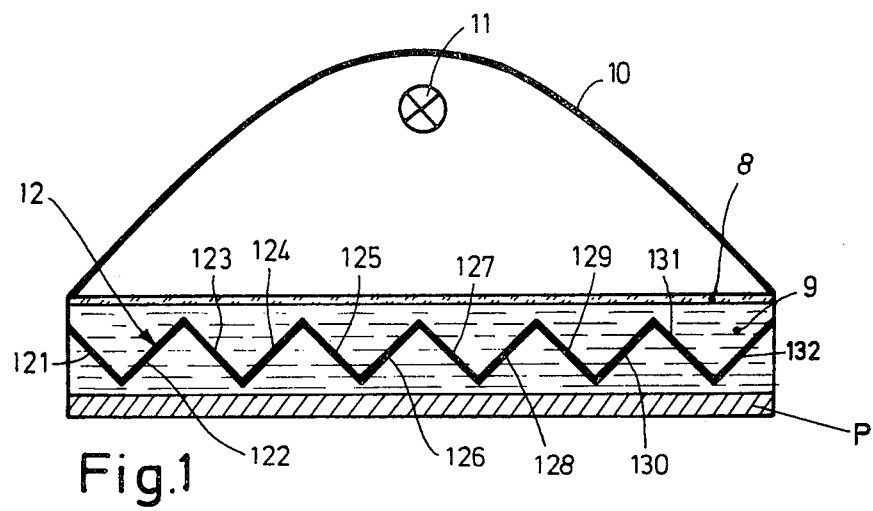
FIG. 1 is a cross-section of a first embodiment of a vehicle headlight in accordance with the invention.

In FIG. 1 a light source 11 is shown at the focus of a parabolic mirror 10. The light from the light source 11 incident on the parabolic mirror 10 is relfected from the mirror in a direction parallel to the optic axis. In the path of the beam of the light thus incident upon the parabolic mirror an interference polarizer 12 is provided consisting of several polarizing sections 121,122, ... 132, a cross-section of which, in a plane passing through the optic axis, shows up as a zigzag line. The apex angle formed by each pair of successive polarizing sections is 90 degrees, whereas the angle at which each polarizing section is set to the optic axis is either +45° or −45°. An absorption polarizing filter P is provided to "clean up" the output of the interference polarizer 12, which is a thin layer polarizer and has a strong polarizing effect, but allows a certain amount of unpolarized light to get through.

The interference-type polarizer 12 can, furthermore, be immersed or embedded in a medium having an index of refraction greater than 1 and having boundary surfaces perpendicular to the optic axis, for example in an immersion liquid, as indicated at 9 in FIG. 1. The degree of polarization obtainable in the interference-type polarizer 12 can thus be substantially improved. FIG. 1 also shows a transparent separating wall 8 that can be made of glass and serves, along with the component P which is actually the "clean up" filter, to contain the space which is to be filled with the immersion fluid 9.

Figure 2:
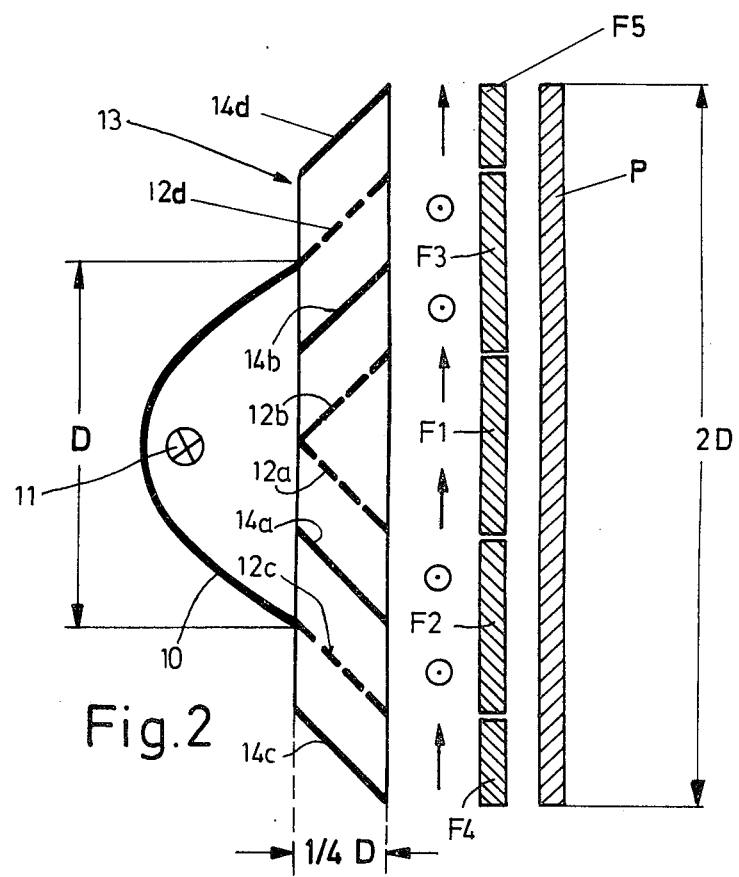
FIG. 2 is a cross-section of a second embodiment of a vehicle headlight in accordance with the invention.

FIG. 2 shows the second illustrative embodiment of the invention in which the polarized light headlight is a rectangular headlight of small depth dimension. The light source 11 is here again located at the focus of a parabolic reflector 10. A composite prism plate 13 is disposed in front of the parabolic reflector 10 and has a thickness equal to one fourth of the diameter D of the parabolic reflector 10 in the plane of the cross-section through the focus shown in the drawing. The peripheral edge of the prism plate 13 is oblique, giving a trapezoidal cross-section in the illustrated plane. The prism plate 13 contains both an interference-type polarizer 12 and reflecting surfaces 14, the latter serving to deflect the path of rays reflected from the interference-type polarizer 12. The interference-type polarizer 12 consists of four polarizing sections 12a, 12b, 12c and 12d which diverge fanwise from the optic axis all at the same angle, namely 45°, to the optic axis, in the manner of a louvre diverging from a central plane. The polarizing sections 12a and 12c in FIG. 2 accordingly run from the upper left to the lower right and the polarizing sections 12b and 12d run, in the plane of the drawing, from the lower left to the upper right. The two polarizing sections 12a and 12b together form a V with the apex on a plane through the optic axis.

Between the polarizing sections 12a and 12c and parallel to both of them is a surface 14a functioning as a reflecting layer. Similarly, between the polarizing sections 12b and 12d and parallel to both of them is a reflecting surface 14b. Finally, below the polarizing section 12c, as seen in the plane of the drawing, is another reflecting surface 14c and, similarly, also a reflecting surface 14d above the polarizing section 12d. The arrangement of the polarizing sections and reflecting surfaces is such that light beamed parallel to the optic axis by the reflector 10 falls partly on the polarizing sections 12a and 12b and partly on the reflecting surfaces 14a and 14b and none passes without encountering one of these elements.

The bundle of rays falling on the polarizing sections 12a and 12b is transmitted through these sections in part and is in part reflected, in the illustrated case, upwards or downwards as the case may be. Both the transmitted and reflected bundles of rays are to a great extent linearly polarized. In the case of the bundle of rays transmitted further in the original direction, the vector of the electrical field is parallel to the plane of the drawing. In the case of these reflected bundles of rays the vector of the electric field strength is perpendicular to the plane of the drawing. These two portions of the original bundle of rays are reflected back into the direction parallel to the optic axis by the respective reflecting surfaces 14a and 14b. The two bundles of rays from the reflector 10 that fall on the respective reflecting surfaces 14a and 14b are reflected off the rear side of these surfaces onto the respective polarizing sections 12c and 12d. They are, again, partly reflected and partly transmitted by these polarizing sections. In the case of the reflected portion of these rays the vector of the electric field strength is again perpendicular to the plane of the drawing, whereas the transmitted portion of the ray bundle has its vector of electrical field strength parallel to the plane of the drawing. The two transmitted ray bundles are then reflected by the respective reflecting surfaces 14c and 14d and thereby brought into the direction parallel to the optic axis.

In the above-described manner all the light projected by the reflector 10 is spread out over the double length 2D (i.e. twice the diameter of the parabolic reflector) and the vector of electrical field strength is ultimately parallel and perpendicular to the plane of the drawing. In order to provide a unitary direction of polarization for the light coming out of the prism plate 13 and at the same time to turn the direction of polarization uniformly to an orientation 45° to the horizontal, in front of each of the described regions of output of the prism plate that within themselves deliver light of the same direction of polarization, there are provided halfwave plates $F_1$, $F_2$, $F_3$, $F_4$ and $F_5$ of the corresponding orientation to bring about the result just stated. Halfwave plates, so-called, are well known devices for rotating the plane of polarization and need not be further described here.

Since the interference-type polarizers do not polarize the light to a great enough extent to meet the requirements of an anti-glare headlight system, the light issuing to the right of the previously described elements 10,11,12,13 and 14 of the headlight system, as shown in FIG. 2, still contains a disturbing unpolarized component. In order to suppress this undesired component, the entire beam is passed through an absorption-type polarizing filter P just after passing through the halfwave plates $F_1$, $F_2$, $F_3$, $F_4$ and $F_5$. The selected polarization direction of the absorption-type polarizing filter corresponds to the intended direction of polarization of the light coming out of the halfwave plates.

Figure 3:
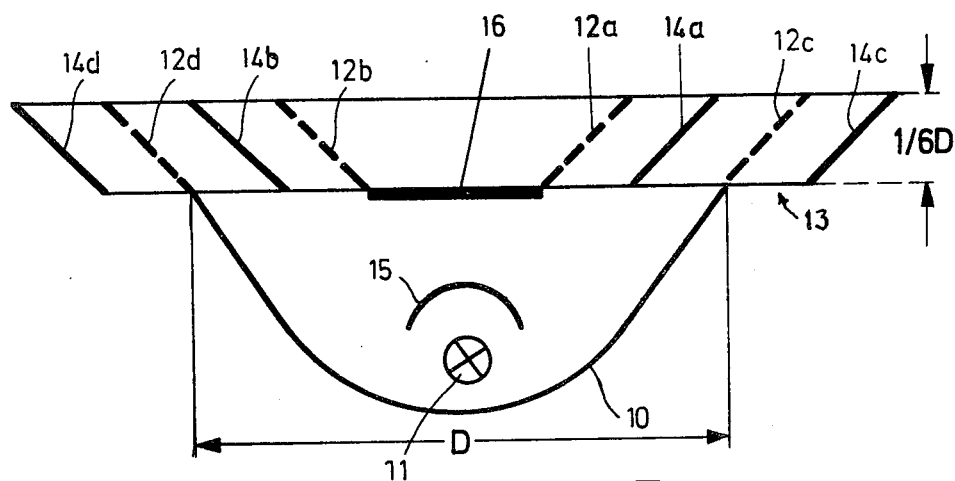
FIG. 3 is a cross-section of a third embodiment of a vehicle headlight in accordance with the invention.

The embodiment illustrated in FIG. 3 differs from that shown in FIG. 2 by the provision of a baffle or mask 15 for the light source 11 and the further provision of a mirror surface on the face of the polarizing prism assembly 13, which faces the light source, opposite the masking baffle 15. The slight light loss resulting from this structure is to be compared with the still smaller physical depth of the prism structure 13, which now is only one sixth of the diameter D of the parabolic mirror 10.

Figure 4:
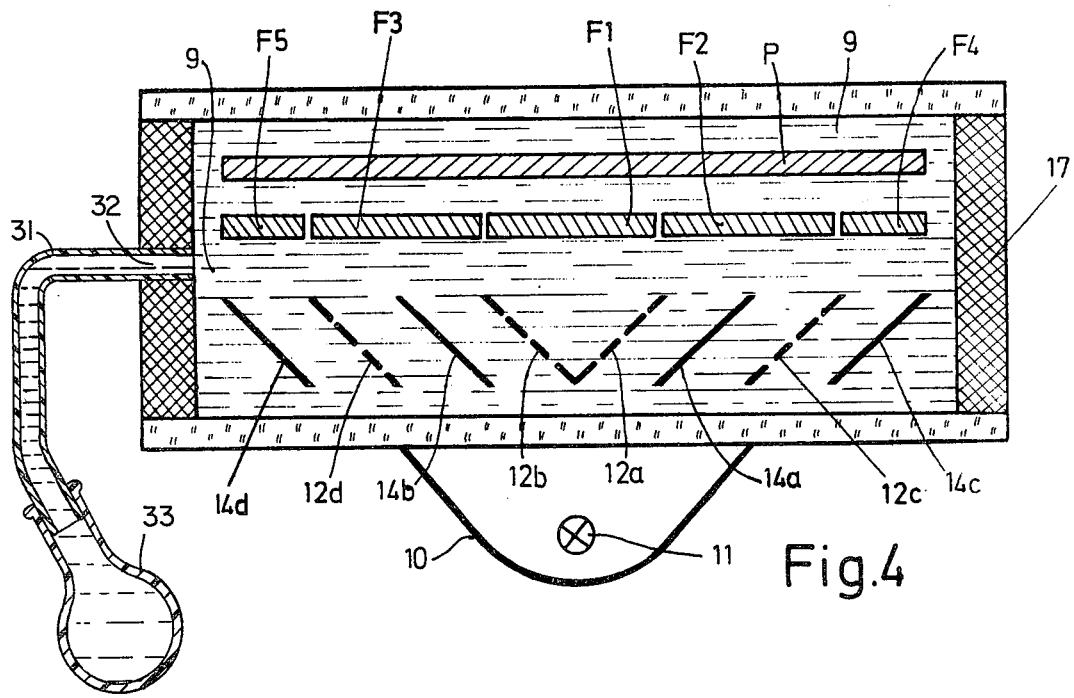
FIG. 4 is a cross-section of a fourth embodiment of a vehicle headlight in accordance with the invention.

FIG. 4 shows still another embodiment of the invention constituting a further development of the embodiment of FIG. 2. The prism plate 13 is here dispensed with. The polarizing sections 12a, 12b, 12c and 12d and the reflecting layers 14a, 14b, 14c and 14d, which are disposed relative to each other and to the light source in the same manner as in FIG. 2, are constituted in the embodiment of FIG. 4 of transparent plates or films held in a frame not shown in the drawing. The entire polarizing system, including the aforesaid polarizing sections and reflecting layers and also the halfwave plates $F_1$, $F_2$, $F_3$, $F_4$ and $F_5$ and the absorption-type polarizing filter P are placed in a cuvette 17 filled with a liquid transmission medium 9 having an index of refraction so chosen that the desired Brewster angle of 45° is obtained in the use of the polarizing section 12a, 12b, 12c and 12d.

Since the thermal expansion coefficient of the liquid transmission medium may deviate substantially from the thermal expansion coefficient of the cuvette 17 under certain circumstances, the cuvette 17 is accordingly preferably provided with a connection 31, which may be in part flexible, fitting into a bore 32 and leading to an expansion vessel 33.

Instead of the liquid transmission medium 9, stiffly hardening transmission medium can be poured into the cuvette 17, allowing the cuvette structure to be removed after hardening of the transmission medium. The advantage is thus obtained that all optical parts are cast into the transmission medium and that disturbing reflections from the surfaces are reduced to a minimum. The cast prism, furthermore, has highly polished plane surfaces and requires no subsequent machining.

Figures 5, 6:
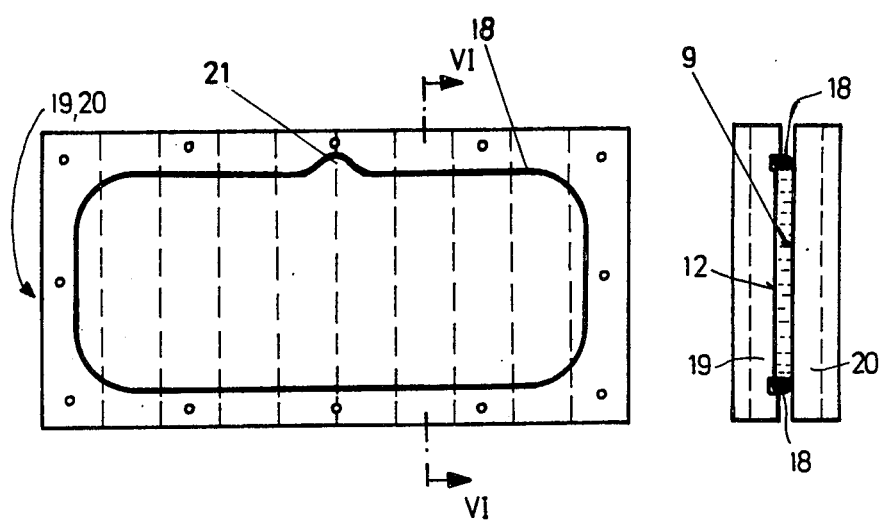
FIG. 5 is a plan view of two stepped prisms of an interference-type polarizer for use in embodiments of the invention, including a sealing ring for containing an immersion fluid.
FIG. 6 is a cross-section along line VI—VI of FIG. 5.

In the embodiments above described in which the interference polarizer is embedded in a solid medium having an index of refraction greater than 1, difficulties frequently arise if the assembly is held together by an adhesive, because the interference polarizer may not always withstand the mechanical tension and shear forces which may arise during initial assembly by adhesion and in operation. In these cases, it has been found desirable to bind together the two components 19 and 20 made of material with a high refractive index with a liquid transmission medium 9, as shown in FIGS. 5 and 6. Thus, the component 19 may carry the interference polarizer 12 as a layer, as seen in cross-section in FIG. 6.

The two components 19 and 20 made of material of high refractive index can in such case be constituted as step-prisms. The liquid transmission medium 9 is prevented from leaking out by the sealing ring 18 and can expand into the space 21 when the temperature rises.

Although the invention has been described with respect to particular embodiments, it is to be understood that variations are possible within the inventive concept.

We claim:
1. A polarized light headlight for a vehicle, comprising:
an interference-type polarizing means (12) comprising polarizing sections (12a, 12b, 12c, 12d) disposed in diverging louvre fashion about a longitudinal median plane of an incident light beam and a set of reflecting layers (14a, 14b, 14c, 14d) alternating between adjacent and similarly directed polarizing sections,
said polarizing sections and said reflecting layers each being set at an angle of 45° to said median plane, said polarizing sections and said reflecting layers being so constituted that no part of the incident beam reaching said interference-type polarizer fails to impinge either on one of said polarizing sections or on one of said reflecting layers,
said polarizing sections and reflecting layers being of such contours that the projection of each of them perpendicularly on said median plane is substantially a rectangle and all said rectangles are sub- stantially congruent.

2. A polarized headlight as defined in claim 1 in which said polarizing sections and reflecting layers are so spaced that their respective projections parallel to the axis of the projected light beam upon a plane perpendicular to said axis are substantially rectangles fitting together without substantial overlap or gaps to form a larger rectangle.

3. A polarized light headlight as defined in claim 1, in which said polarizing sections ($12a$, $12b$, $12c$, $12d$) and said reflecting layers ($14a$, $14b$, $14c$, $14d$) are all provided as components of a composite prism plate ($13$).

4. A polarized light headlight as defined in claim 3, in which halfwave plates ($F_1$, $F_2$, ... $F_5$) are provided at the light exit side of said prism plate ($13$) comprising said polarizing sections and said reflecting layers, said halfwave plates being disposed so as to equalize the different polarization directions of the different bundles of rays issuing from said plate prism and bringing their directions of polarization all into the same plane.

5. A polarized light headlight as defined in claim 1, in which at least the polarizing sections ($12a$, $12b$, $12c$, $12d$) and the reflecting layers ($14a$, $14b$, $14c$, $14d$) are immersed in a liquid transmission medium, and in which, further, a cuvette ($17$) is provided for containing said liquid medium.

6. A polarized light headlight as defined in claim 5, in which said cuvette ($17$) is connected to an expansion vessel for relieving the pressure of thermal expansion of said liquid medium.

* * * * *